United States Patent
Hays (10) Patent No.: US 8,234,182 B2
(45) Date of Patent: Jul. 31, 2012

(54) SYSTEMS FOR PROVIDING CUSTOMIZED OR PERSONALIZED MEMORABILIA IN ASSOCIATION WITH VENDOR BIDDING

(75) Inventor: Gerry A Hays, Carmel, IN (US)

(73) Assignee: Apparel Media Group, Inc., Chicago, IL (US)

( * ) Notice: Subject to any disclaimer, the term of this patent is extended or adjusted under 35 U.S.C. 154(b) by 239 days.

(21) Appl. No.: 12/716,718

(22) Filed: Mar. 3, 2010

(65) Prior Publication Data

US 2010/0228615 A1    Sep. 9, 2010

Related U.S. Application Data

(60) Provisional application No. 61/157,009, filed on Mar. 3, 2009.

(51) Int. Cl.
*G06Q 30/00* (2006.01)

(52) U.S. Cl. .............. 705/26.5; 705/26.1; 705/26.3; 705/26.4; 705/26.41

(58) Field of Classification Search ...... 705/14.4–14.73, 705/26.1–27.2

See application file for complete search history.

(56) References Cited

U.S. PATENT DOCUMENTS

| | | | |
|---|---|---|---|
| 2002/0035507 A1* | 3/2002 | Singh | 705/14 |
| 2004/0267629 A1* | 12/2004 | Herrmann et al. | 705/26 |
| 2008/0040236 A1* | 2/2008 | Isowa | 705/26 |
| 2008/0133375 A1* | 6/2008 | Torrenegra | 705/26 |
| 2009/0287596 A1* | 11/2009 | Torrenegra | 705/37 |

OTHER PUBLICATIONS www.finsasponsor.com. Dec. 9, 2008. Recovered from www.Archive.org.*

* cited by examiner

*Primary Examiner* — Will Allen
(74) *Attorney, Agent, or Firm* — Ice Miller LLP (57) ABSTRACT

A system and method for providing customized or personalized memorabilia to end users, wherein the system allows the price for the customized or personalized memorabilia to be established by obtaining the lowest production costs from approved vendors, and further allowing such costs to be offset by any sponsorship underwriting of the memorabilia. The system further allows establishment of advertising to target demographic audiences by underwriting customized or personalized memorabilia orders and placing advertising indicia for the sponsor on or with the ordered customized or personalized memorabilia.

7 Claims, 5 Drawing Sheets

| | |
|---|---|
| 310 | Member finalizes project details (i.e. Model Number, # of units, Type of print or embroidery) |
| 320 | Create a ceiling (i.e. Service Provider would provide a ceiling quote) that is "non-binding" unless sponsors have agreed to participate |
| 330 | Release the project out for "Reverse Bid" to any Service Provider registered vendor in the country that wishes to bid for the business (i.e. purchase the apparel, print the apparel, etc.)....based on art created by Service Provider. |
| 340 | After established time, Member must accept lowest bid, and will find out if a sponsor has been added to help underwrite the project. |

| | | | |
|---|---|---|---|
| Ceiling Bid: | | | $14.49 |
| Auction (24 hour period) | A Printer | | $14.29 |
| | B Printer | | $12.99 |
| | C Printer | | $11.99 |
| | D Printer | | $10.99 |
| | E Printer | | $9.89 |
| Service Provider's Mark-up | | 20% | $1.98 |
| Member commission per unit | | $0.35 | $0.35 |
| Campus Director commissions per Unit | | $0.50 | $0.50 |
| Subtotal Order Per Unit | | | $12.72 |
| Greek Fee | | | $1.07 |
| Total Bid (As presented to member) | | | $13.80 |
| | | | |
| Sponsor Commitment | | $3.00 | ($1.50) |
| Service Provider keeps half | | | |
| | | | $12.30 |
| Service Provider's Gross Profit | $3.48 (28%) | | |

| 310 | Member finalizes project details (i.e. Model Number, # of units, Type of print or embroidery) |
| --- | --- |
| 320 | Create a ceiling (i.e. Service Provider would provide a ceiling quote) that is "non-binding" unless sponsors have agreed to participate |
| 330 | Release the project out for "Reverse Bid" to any Service Provider registered vendor in the country that wishes to bid for the business (i.e. purchase the apparel, print the apparel, etc.),....based on art created by Service Provider. |
| 340 | After established time, Member must accept lowest bid, and will find out if a sponsor has been added to help underwrite the project. |

| Ceiling Bid: | | | $14.49 |
| --- | --- | --- | --- |
| Auction (24 hour period) | A Printer | | $14.29 |
| | B Printer | | $12.99 |
| | C Printer | | $11.99 |
| | D Printer | | $10.99 |
| | E Printer | | $9.89 |
| Service Provider's Mark-up | | 20% | $1.98 |
| Member commission per unit | | $0.35 | $0.35 |
| Campus Director commissions per Unit | | $0.50 | $0.50 |
| Subtotal Order Per Unit | | | $12.72 |
| Greek Fee | | | $1.07 |
| Total Bid (As presented to member) | | | $13.80 |
| | | | |
| Sponsor Commitment | | $3.00 | ($1.50) |
| Service Provider keeps half | | | |
| | | | $12.30 |
| Service Provider's Gross Profit | $3.48 (28%) | | |

FIG. 5

| Project Number / Project Name | | | |
|---|---|---|---|
| | Yes | Apparel Model Selected | View |
| | Yes | Art Description Submitted | View |
| | Yes | Quantities Selected | View |
| | Yes | Art Design Approved | View |
| | Yes | Sponsorship Requested | View |
| | Yes | Reverse Auction Initiated | View |
| | No | Payment Sent to Service Provider | View |

| Model # | Color | Quantities |
|---|---|---|
| AA2005 | Pink | 89 |
| Production Quote (Per Unit) | Sponsorship Contribution (Per Unit) | Final Cost Per Unit |
| $13.45 | $2.00 | $11.45 |
| Sponsor | Estimated Delivery Date | Member Commission |
| Red Bull | January 18, 2008 | $37.50 |

SYSTEMS FOR PROVIDING CUSTOMIZED OR PERSONALIZED MEMORABILIA IN ASSOCIATION WITH VENDOR BIDDING

PRIORITY

This application claims priority to U.S. Provisional Patent Application Ser. No. 61/157,009 filed Mar. 3, 2009, and entitled "System for Sales, Pricing and Sourcing Sponsored Materials to Target Market, the contents of which are hereby incorporated by reference herein.

BACKGROUND

Customized or personalized memorabilia is created for many events, including high school or collegiate dances, fraternity and sorority events, athletic endeavors such as public marathons, and fund raising events. Such customized or personalized memorabilia may include t-shirts or other apparel, plates, glasses, mugs, towels, photo books, and/or many other items that are often emblazoned with a design and/or text that identifies the event and/or the organization or organizations that are participating in the event. Typically, the organizations participating in the events often order one or more pieces of customized or personalized memorabilia for each individual participating in the event. However, purchasing these customized or personalized memorabilia can add substantial costs to the event, and the organization organizing the event.

Additionally, corporations seek ways to reach specific market segments that represent the most likely purchasers of its services or products. Further, participants in social events or athletic events for which customized or personalized memorabilia is created often represents a specific demographic segment that is of interest to particular advertisers, particularly if the personalized memorabilia will be publicly used or worn after the original event, and if the participants represent a social or athletic segment of the population that is admired by the target demographic segment. Therefore, a method for providing advertisers with an ability to sponsor particular orders of customized or personalized memorabilia in return for placing advertising indicia upon the customized or personalized memorabilia would be appreciated by both sponsors and purchasers of customized or personalized memorabilia.

DETAILED DESCRIPTION

The present application relates to a system and method for establishing, pricing, and submitting customized or personalized memorabilia to end users, and for establishing a system whereby the end personalized memorabilia is sponsored by an underwriter interested in the demographic related to the end user. The embodiments of the present application will be best understood by reference to the drawings. It will be understood that the components of the present embodiments, as generally described and illustrated in the figures herein, could be arranged and designed in a wide variety of different configurations. Thus, the following detailed description of the embodiments of any apparatus, system, and method disclosed herein and represented in FIGS. 1-5, is not intended to limit the scope of the invention, as claimed, but is merely representative of certain embodiments of the invention.

Specific examples are given to illustrate aspects of the invention, but those of skill in the relevant art(s) will understand that other examples may also fall within the meaning of the terms used, and hence within the scope of one or more claims. An "embodiment" may be a system, an article of manufacture, a method, the product of a process, and/or a signal which configures a computer random access memory, disk, CD, DVD, or other computer-readable media.

A system disclosed herein optionally operates in a computer network and/or on a computer processor to match an end user of customized or personalized memorabilia with a competitively priced producer of the customized or personalized memorabilia requested, and may further match the end user with a potential sponsor for the customized or personalized memorabilia to supply the end user with customized or personalized memorabilia at a reduced cost or no cost.

In at least one embodiment, the system receives input requests from an end user (hereinafter a "member") for customized or personalized memorabilia (such as a t-shirt commemorating a particular event), wherein the member sets forth the parameters of the customized or personalized memorabilia ordered. For example, the parameters for a particular order may include the size(s), color(s), model(s), etc. of the customized or personalized memorabilia ordered. In addition, the member may optionally request customized art to be utilized or included on the customized or personalized memorabilia ordered. Optionally, the system includes multiple prompts to direct the end user to establish the parameters for the ordered customized or personalized memorabilia, or the member may contact a representative of a service provider and the service provider will utilize the system to input an order for customized or personalized memorabilia.

Figure 1:
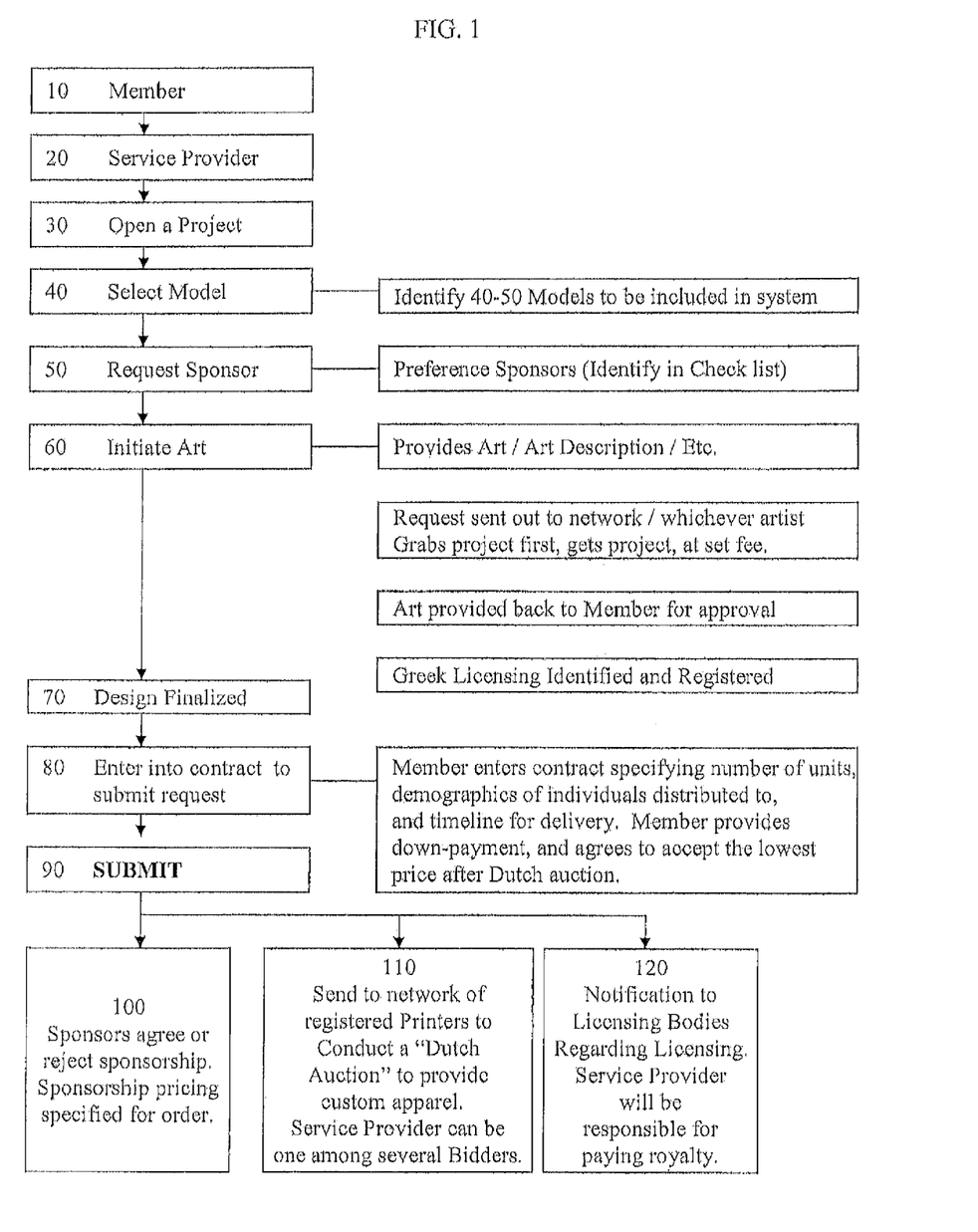
FIG. 1 is a flow diagram according to at least one embodiment of the present application, setting forth a system for establishing, pricing, and submitting customized or personalized memorabilia to end users, and further providing means for underwriting the orders of customized or personalized memorabilia through sponsorship bidding.

Turning to FIG. 1, at least one embodiment of the present application is set forth wherein the member contacts the service provider to initiate an order for customized or personalized memorabilia. In a first step 10, the member contacts the service provider maintaining the system and in step 20 requests that the service provider establish an order or project for the member. As an option, the member contacts the service provider either by logging on to a website to access the system in a computer network, or contacts a representative associated with the service provider. In step 30, the service provider, either through the computer environment or through a representative, opens a project for the member on the system, optionally with a project identification number to allow for future identification of the order for customized or personalized memorabilia. Once a project is opened, in step 40 the member sets forth the parameters of the customized or personalized memorabilia for the order, and, for example, selects a model of customized or personalized memorabilia from one of several items or models to be personalized or customized for the order. For example, as shown in FIG. 1, step 40 may include selection of a one or more of 40-50 models included in the system to be provided to the member from the service provider, and to be customized as dictated by the member's parameters and details.

Once the model or models have been selected and additional parameters and details have been specified for the order, in step 50, the member is given the option of selecting a sponsor to help underwrite the cost of the order or orders. In at least one embodiment, selection of sponsor preference is allowed by checking or indicating preference for one or more sponsors from a list of sponsors who have qualified to be a sponsor for the service provider's order. As an option, when each sponsor is checked or preferenced from the list, the system may prompt the member to enter additional information regarding demographic information of the member or individuals that will be receiving the customized or personalized memorabilia. Further optionally, the system may include a set of parameters for each sponsor that prequalifies each member order for listed sponsors based upon the responses to the demographic information provided at the time of the order.

Thereafter, in step 60, customized artwork to appear on the customized or personalized memorabilia is either uploaded by the member or service provider, or described in such a matter that a commissioned artist can submit an art proof. In the event that the member requires an artist to provide an art proof, the system generates a project order, and the project order is uploaded into a database or out to approved artists that have contracted or agree to provide an art proof at a designated price. Once an artist selects the project at the set fee, no additional artist is allowed to select the project. Upon completion of the art proof from the artist, the art proof is submitted to the service provider and/or to the member for approval. Upon receiving approval from the member, the service provider reviews the complete request and identifies any licensing that must be obtained to utilize the art proof on the customized or personalized memorabilia ordered, and obtains such licensing for the order. For example, in the event that a fraternity or sorority name is used on the art proof, the appropriate licensing fee is applied and submitted through the licensing body, and the cost is included in the data collected for the identified order, and at step 70, the design is finalized by combining the order parameters with the art proof.

Thereafter, in step 80, a contract specifying the number of units, the design parameters, time for delivery, and/or any other relevant information for the order. Additionally, in step 80, the member will optionally be required to submit a down-payment to initiate the production of the order, and will optionally be required to purchase the customized or personalized memorabilia at the price established by the bidding and sponsorship results.

Upon authorization and completion of step 80, the order is submitted for sponsor approval in step 90 In the event a sponsor fails to approve or disapprove the logo placement, the system will automatically approve the request so the order can proceed on schedule. In step 100, any selected sponsors are allowed to approve or reject an order for sponsorship. As noted in step 50, a first screening or a additional checklist may automatically preclude some sponsors from being notified of the order if the demographic information does not match predetermined guidelines. In the event that sponsorship is approved by one or more of the established sponsors, the amount of sponsorship is removed from the established sponsor's escrow account held by the service provider, and that amount or a portion of that amount is associated with the order number as a payment toward the final order. Additionally, upon approval any sponsor identification to be added to the customized or personalized memorabilia is added to the order and specified in the order parameters. In the event that no sponsors approve sponsorship, no sponsorship funds are applied to the order, and the order proceeds on to step 110, wherein the order specification is submitted to a database or network of approved vendors who each submit a price bid for the order based upon the specifications submitted, wherein the lowest bidder to submit by the deadline will be selected to process the order (sometimes referred to as a "Dutch Auction"). Once an established deadline for submissions of price bids is reached, the lowest bidder is identified, and that approved vendor is notified that it should begin processing the order for submission to either the service provider or the member by the specified date. Additionally, the price associated with the lowest bid is associated with the order in the system, and this information, coupled with the additional costs and sponsorship payments are utilized to determine the final order price to be paid by the member.

Figure 2:
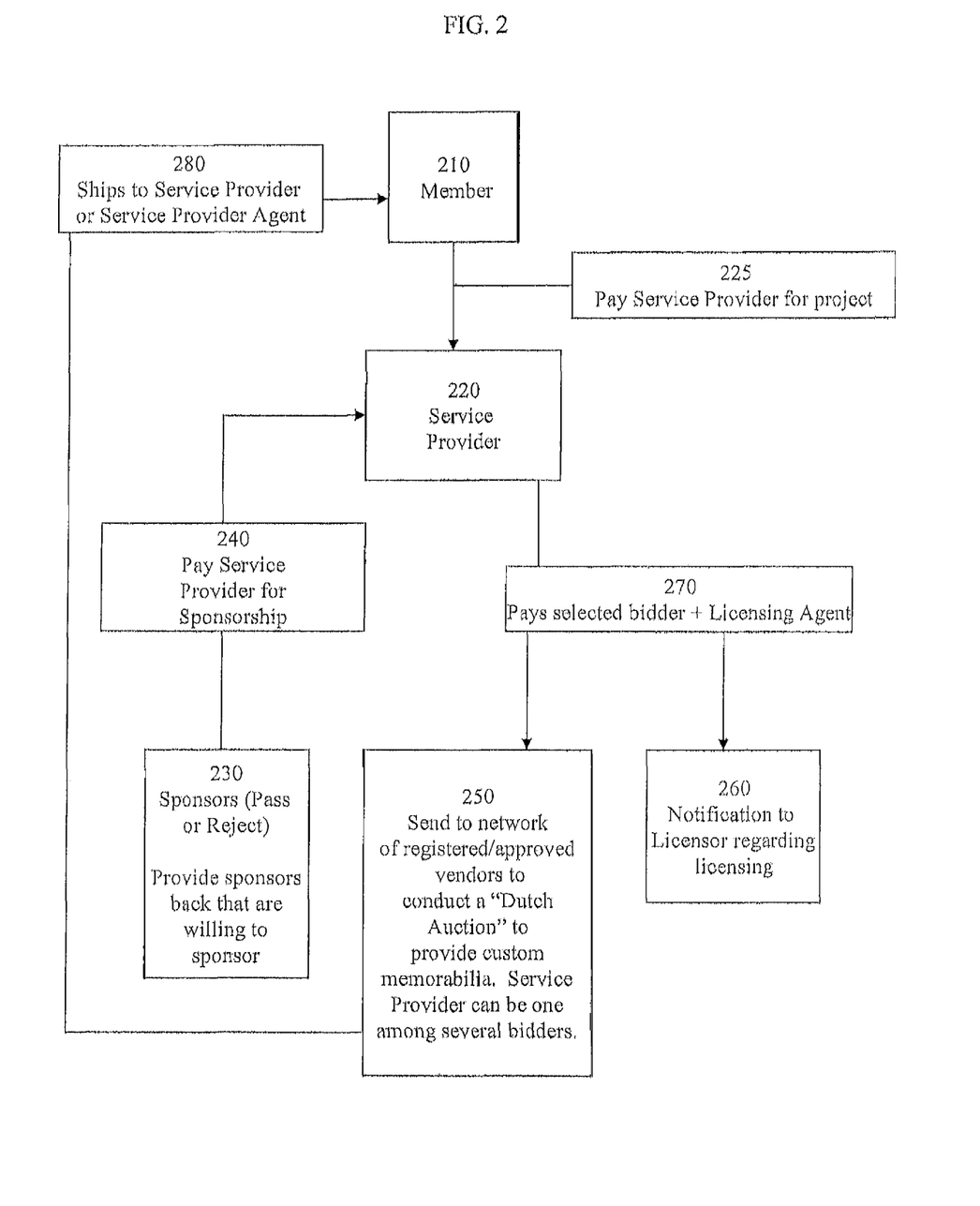
FIG. 2 is a flow diagram according to at least one embodiment of the present application, setting forth exemplary steps in operating a system for establishing, pricing, and submitting customized or personalized memorabilia to end users, and further providing means for underwriting the orders of customized or personalized memorabilia through sponsorship bidding.

Turning now to FIG. 2, according to at least one other embodiment, a system for providing customized or personalized memorabilia to an end user is provided. In step 210, a member of the service provider's system contacts the service provider. In step 220, an order for customized or personalized memorabilia is established with all parameters of the order established, and the member makes a down-payment on the order in step 225. Thereafter, in step 230, each sponsor registered with the service provider and chosen by the member in the order parameters set forth in step 220 is contacted through the service provider system and allowed to accept or reject sponsorship for the particular order. In the event that a sponsor accepts sponsorship for the order, the sponsor pays the sponsorship amount to the service provider either through an account or payment method associated with the service provider system, or by other means in step 240, and the funds are associated with the order. Once sponsorship or lack thereof is established, the order, along with the parameters, is submitted to vendors that have been approved or registered with the service provider to receive bids on the order in step 250. In at least one embodiment, the service provider may be one of the registered or approved vendors participating in the bidding process, or the service provider may elect not to submit a particular order for the Dutch Auction method of establishing the price, and may elect to accept the order at a price established by the service provider. Once the vendor is selected, the price for the order can be determined, and any licensing required for production of the customized or personalized memorabilia in the order can be identified, with notice given to licensors in step 260. Thereafter, upon shipment of the order to the service provider or agent of the service provider, the selected vendor and licensor is paid in step 270, and the order is then delivered to the member. Optionally, the order may be delivered, directly to the member from the vendor, with payment of the vendor occurring upon a time predetermined between the vendor and the service provider.

Figure 3:
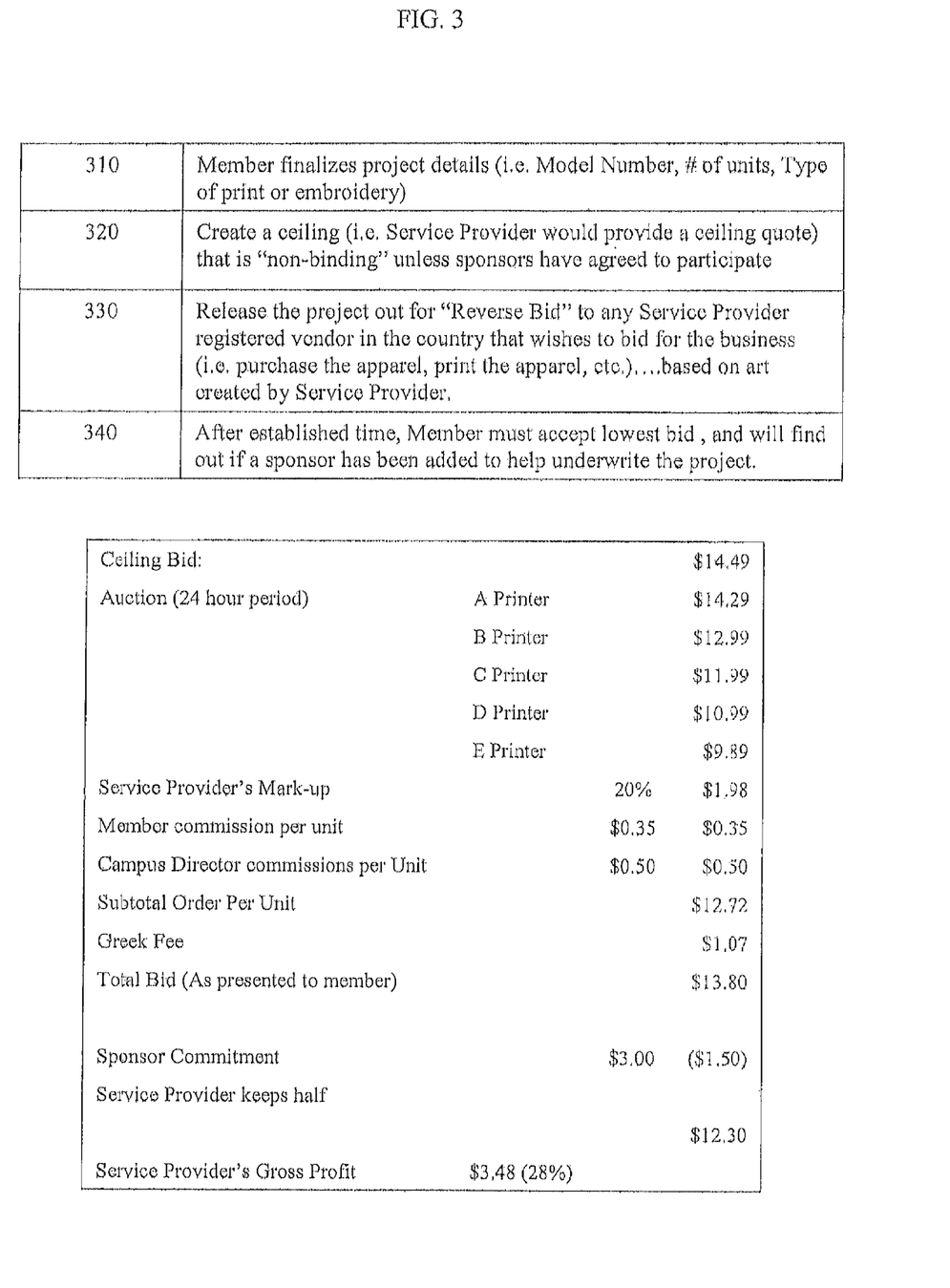
FIG. 3 is a flow diagram according to at least one embodiment of the present application, setting forth exemplary steps in establishing orders and details for orders placed in a system for establishing, pricing, and submitting customized or personalized memorabilia to end users, and further showing an exemplary calculation system for establishing costs and payments to designated individuals using the system.

As set forth in FIG. 3, in yet at least one other embodiment, a system for providing customized or personalized memorabilia to an end user may include a system wherein a member of a service provider's network establishes an order for customized or personalized memorabilia, including all details of the order and the parameters for any artwork to be included on the customized or personalized memorabilia in a first step 310. These project details are optionally prompted and recorded as a member fills in details associated with the order by logging onto a web page established by the service provider, and wherein a series of options are set out to the member for selecting the memorabilia to be customized or personalized, and wherein the member is given options for establishing the size of the order and other options related to the order. Upon obtaining all parameters and details of the order, in step 320, the service provider provides a quote for the order to the member, wherein the service provider establishes a total price ceiling for the order. In certain embodiments, the quoted price ceiling may be binding or non-binding, and may be determined based upon whether there is a sponsor registered with the service provider that is willing to underwrite the particular order.

Upon agreement by the member to accept the ceiling quote, in step 330, the order details and parameters are released to approved vendors (i.e., in the case of an order of a personalized or customized t-shirt, all approved printers and t-shirt makers in the system are notified of the order and order details), and the approved vendors are allowed to submit a bid on the order to the service provider, indicating the price at which the approved vendor is willing to provide the ordered customized or personalized memorabilia. In at least one embodiment, the bid is provided via a secure website or server which tallies each submitted bid for a particular order, and precludes submission of additional bids after a designated deadline. Upon reaching the deadline, the lowest bid is selected and added to the order details, allowing a final order price to be determined, pending any sponsorship by registered sponsors. Once the member accepts the order at the bid amount, the vendor with the lowest bid is contacted by the service provider, and instructed to fulfill the order.

In one exemplary embodiment shown in FIG. 3, the pricing data established by the system associated with an order is shown. Therein, a member established an order for a certain number of t-shirts with particular details and parameters, and the service provided a ceiling bid of $14.49 per t-shirt. Upon submitting the order parameters to approved vendors (t-shirt printers, in this example), five printers (identified as A Printer, B Printer, C Printer, D Printer, and E Printer) submitted bids for $14.29, $12.99, $11.99, $10.99, and $9.89 per specified t-shirt within the bid period (in this example, a 24 hour bid period was established). Thereafter, with the selection of the lowest price vendor, the service provider adds a charge for the services provided in coordinating the production to the order (in this example, a charge of $1.98 per shirt, equal to 20% of the vendor price). Further, additional costs associated with the production of the customized or personalized memorabilia are totaled by the system, arriving at the total cost per unit (or on a per order basis, if so desired). In the exemplary embodiment, such additional fees include, service provider agent commissions (shown as "Campus Director" commission in this example) that are paid to the agent making any such sale, member commissions that may be paid to the member making the order, and any licensing fee (herein shown as the "Greek Fee"). As shown in the exemplary embodiment in FIG. 3, the total cost per shirt is $13.80 with the relevant fees. Additionally, any sponsorship underwriting is applied to the total fee as determined appropriate by the service provider. In this instance, the service provider has established that 50% of any sponsorship commitment shall be retained by the service provider for establishing the sponsorship. This effectively reduces the member's cost per shirt to $12.30 per shirt ordered by the member. While an exemplary cost breakdown is shown herein, it will be appreciated that other fees, or other percentages may be established and automatically calculated for each order through an automated process performed by a computer processor or other means. In one exemplary embodiment, the costs established by the vendor bidding and other methods for a particular order are recorded in a database associated with a computer processor, and all additional commissions and sponsorships for that particular order are automatically applied to the total cost for the member such that the computer processor automatically provides the total order cost to the member through an intranet or the Internet in a web-based application.

Figure 4:
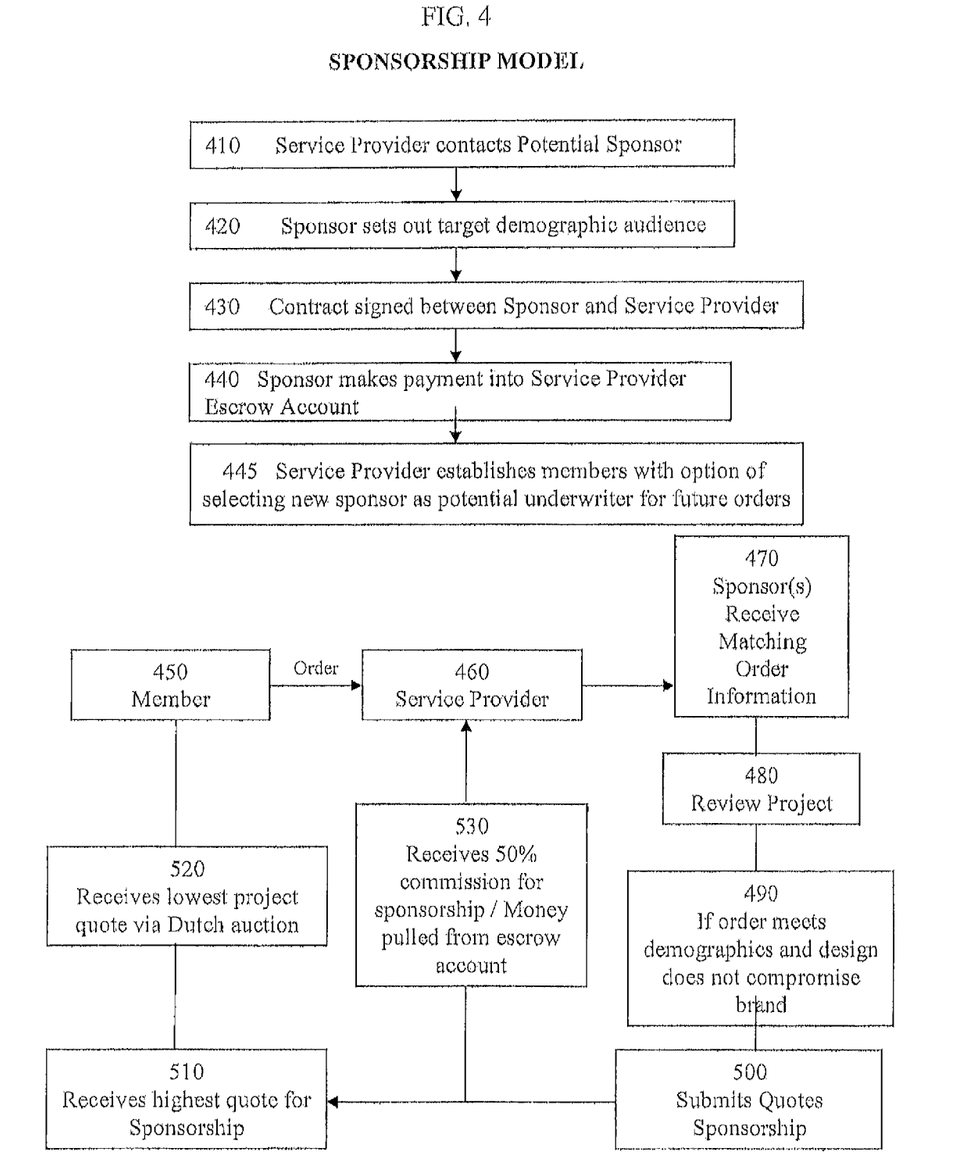
FIG. 4 is a flow diagram according to at least one embodiment of the present application, setting forth exemplary steps in establishing sponsorships for the underwriting of orders placed in a system for establishing, pricing, and submitting customized or personalized memorabilia to end users.

Turning now to FIG. 4, a sponsorship system for establishing advertising to a target audience through sponsorship of customized or personalized memorabilia is provided. In at least one embodiment, a service provider has established a system for providing customized or personalized memorabilia to end users that have registered and become members of the system. Optionally, demographic data of each member associated with the system is stored in a database, providing accessible data for the combined members that have utilized the service provider's system to obtain customized or personalized memorabilia. Further optionally, such information may be provided to interested sponsors who wish to underwrite orders submitted to the system provider's system in exchange for having the underwriter's logo or additional advertising indicia placed upon the customized or personalized memorabilia ordered.

For instance, in step 410, a service provider may initiate contact with a potential sponsor, setting out the opportunity to underwrite orders for particular customized or personalized memorabilia, and noting the various demographics of members currently and previously employing the service provider's system. In the event that the potential sponsor wishes to advertise its goods or services through the use of advertising indicia associated with the customized or personalized memorabilia, the potential sponsor may delineate its target demographic audience to service provider in step 420, and in step 430 enter into a contract with the service provider to pay a fee or a portion of each sponsorship amount to service provider in return for establishing a connection between the member and the sponsor. Upon establishing a contract with service provider in step 430, sponsor will place an agreed upon amount into an escrow account in step 440, which may optionally be accessible by service provider upon approval of sponsorship by sponsor. Further, in at least one optional embodiment, in step 445, service provider will place new sponsor's information within service provider's system, identifying the sponsor as being one potential source for underwriting customized or personalized memorabilia for each member placing an order thereafter. As shown in the flow chart in FIG. 4, each member submitting an order through the service provider's system would submit the order in step 450, setting out the parameters and details of the order. In one optional embodiment, based upon the demographic information associated with the member in the service provider's system and the target demographic audience information provided by each sponsor and held in service provider's database, potential sponsors for a particular order placed on service provider's system may be displayed to a member at the time of order. For instance, if the demographic information maintained in service providers' database for a particular member placing an order for customized or personalized memorabilia matches a sponsor's target demographic audience, the member will have the option of selecting that sponsor as a potential underwriter for the order. If the member's demographic information does not match that sponsor's target demographic audience, the member will not have the option of selecting that sponsor for underwriting the order. Thereafter, once order requirements are established by the service provider in step 460, all potential sponsors selected for a particular order are notified of the availability to underwrite a particular order, and are provided with the details of the order in step 470. In step 480, the sponsors are given the opportunity to review the designs for the customized or personalized memorabilia as well as the demographic data associated with the member placing the order.

In step 490, if the sponsor determines that the design for the customized or personalized memorabilia does not compromise the sponsor's brand, the sponsor approves an order for underwriting through service provider's system. In step 500, the sponsor provides a quote for the amount of underwriting for a particular order. Optionally, service provider's system may employ an auction for each order wherein multiple selected sponsors offer competing bids for a particular order, or wherein multiple sponsors are offered an opportunity to include their advertising indicia on a particular order. Once the sponsor or sponsors for a particular order are selected by the service provider's system in 510, approved vendors may optionally provide bids to provide the ordered customized or personalized memorabilia according to the parameters and details provided by the service provider, with the lowest bid selected at the end of the established time period in step 520. In step 530, the sponsor releases the agreed upon amount for underwriting the project to the service provider, with sponsor retaining a set percentage as a fee for enabling the sponsorship, and applying the remainder of the underwriting amount to the total cost associated with providing the customized or personalized memorabilia to the member. Further, in this embodiment, the member placing the order pays service provider the remaining amount for the order once any sponsor underwriting is applied to the total cost, thereby allowing the member to obtain the customized or personalized memorabilia for an event at a reduced price, and allowing a sponsor to obtain targeted advertising to specific demographic audiences.

Figure 5:
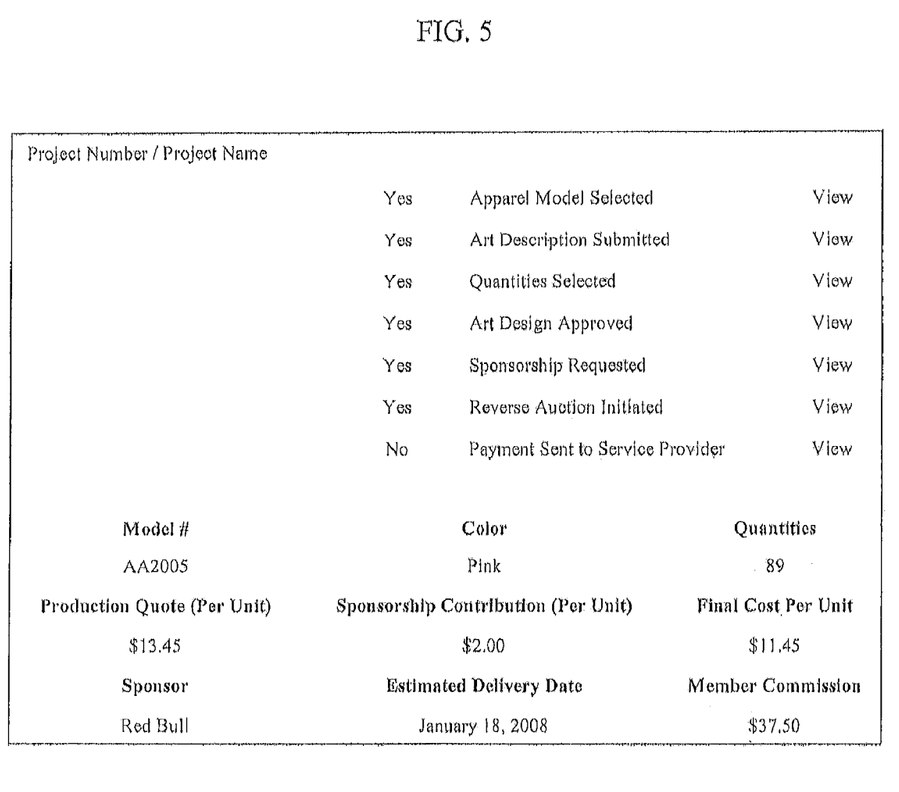
FIG. 5 is an exemplary screen shot of a graphic user interface that may be accessed by a member in setting up and tracking an order in a system for establishing, pricing, and submitting customized or personalized memorabilia to end users.

Additionally, as shown in FIG. 5, at least one embodiment of the present application includes the use of a user interface for a member placing an order for customized or personalized memorabilia wherein certain cost details and order status is provided. As shown in FIG. 5, selected details about the member's order may be provided in a quick-view interface, whereby the member may click on a particular item to review additional details about that particular aspect of the order. In the example provided, the member, upon accessing the service provider's system and selecting a particular order in progress, may click to view details regarding the apparel model selected, art description submitted, quantities selected, the status of the art design approval, whether a sponsorship was requested (and the details of the sponsors selected), whether a reverse auction was initiated, and whether the member's payment has been sent to the service provider. Further, details about the order such as the model number, color or other parameters, quantity ordered, per unit price, sponsorship contribution, and final cost per unit may be displayed in a user interface. Additional details such as the identity of the sponsor, the estimated delivery date of the order, and the member's commission for a particular order can be displayed. Optionally, the quick-view interface may be accessible via a computer network, and may be secured to allow a member to access only that member's orders and order details.

It will be appreciated that other methodologies may be employed to implement the technologies disclosed herein, as the above method is presented for exemplary purposes. For example, while the preceding examples include the use of a website or networked graphic user interface to allow a member to input orders and/or demographic information; further allow the service provider to link sponsor data to specified databases; and allow for sponsors and/or vendors to submit bids for particular orders, other systems may be employed. Further, one of ordinary skill in the art will appreciate that additional features and technologies may be utilized in implementing the foregoing technologies.

What is claimed is:

1. A system for providing customized or personalized memorabilia to an end user comprising:
   a. a processor operable to maintain a service provider's demographic information generated for a member placing an order and order information for customizable memorabilia;
   b. a first database comprising order information input by at least one member utilizing the system;
   c. a second database comprising sponsor target demographics data, whereby the processor is operable to compare the demographic information generated for a member placing an order, and is further operable to generate a list of sponsors whose target demographics data corresponds with the demographic information generated for a member placing an order;
   d. a communication device operable to submit the order information to one or more sponsors identified on the generated list;
   e. a communication device operable to submit the order information provided from a member to customizable memorabilia vendors;
   f. a receiving module operable to receive bids placed from the customizable memorabilia vendors for the order information provided;
   g. a program operable to identify the lowest bid placed by vendors for each discrete order, the program further operable to submit the lowest bid as data utilized to establish pricing for the particular order and thereby establish a price to be paid by the member for the order;
   h. whereby the particular member's order for customized or personalized memorabilia is fulfilled by the vendor submitting the lowest bid upon payment of the total order amount to the service provider;
   i. whereby upon payment of the total order amount to the service provider, the member receives a shipment of customized or personalized memorabilia; and
   j. whereby the service provider is further compensated by a sponsor upon approval of a particular member's order for sponsorship.

2. The system of claim 1, wherein the member's total order amount is reduced by an amount determined by the sponsor's bid to underwrite that particular order.

3. The system of claim 2, wherein the vendors include the service provider.

4. The system of claim 3, wherein the system is further configured to provide the sponsor with details of order information for customized or personalized memorabilia, including any artwork to be incorporated in the customized or personalized memorabilia.

5. A system for providing customized or personalized memorabilia to an end user comprising:

a. a processor operable to maintain a service provider's demographic information generated for a member placing an order and order information for customizable memorabilia; p1 b. a first database comprising order information input by at least one member utilizing the system;
c. a second database comprising sponsor target demographics data, whereby the processor is operable to compare the demographic information generated for a member placing an order, and is further operable to generate a list of sponsors whose target demographics data corresponds with the demographic information generated for a member placing an order;
d. a communication device operable to submit the order information to one or more sponsors identified on the generated list;
e. a communication device operable to submit the order information provided from a member to customizable memorabilia vendors;
f. a receiving module operable to receive bids placed from the customizable memorabilia vendors for the order information provided;
g. a program operable to identify the lowest bid placed by vendors for each discrete order, the program further operable to submit the lowest bid as data utilized to establish pricing for the particular order and thereby establish a price to be paid by the member for the order;
h. a third database including trademark registration information, and further comprising a program operable to compare the order information for customizable memorabilia to the trademark registration information to identify potential misuse of registered trademarks; and i. whereby the particular member's order for customized or personalized memorabilia is fulfilled by the vendor submitting the lowest bid upon payment of the total order amount to the service provider.

6. The system of claim 5, further comprising a graphic design module operable to eliminate order information that misuses registered trademarks.

7. The system of claim 6, whereby the graphic design module creates a customizable design for the customizable memorabilia without the registered trademark information.

* * * * *